Patented Aug. 2, 1949

2,477,695

UNITED STATES PATENT OFFICE 2,477,695

TREATING HYDROSOLS WITH FLUORIDES TO OBTAIN IMPROVED GEL CATALYSTS

Charles N. Kimberlin, Jr., Baton Rouge, La., assignor to Standard Oil Development Company, a corporation of Delaware No Drawing. Application December 30, 1948, Serial No. 68,387

8 Claims. (Cl. 252—451)

The present invention is concerned with a process for the preparation of improved catalysts. The invention more specifically relates to the preparation of improved catalysts suitable for use in cracking, reforming, isomerization, polymerization, and alkylation processes. This invention is particularly concerned with an improved method for preparing granular and spherical catalysts comprising silica suitable for use in various treating operations particularly hydrocarbon cracking operations. In accordance with this invention, catalysts of especially high quality are obtained by controlling the porosity of a silica gel-containing catalyst by treating the hydrosol from which the catalyst is made with hydrofluoric acid.

It is well known in the art to treat vapors and liquids with contacting solids such as silica gel or catalysts containing silica gel as the major component in order to refine these materials. For example, it is known to improve the quality of oils, particularly petroleum oils, by treating the same with catalyst in either fixed bed or fluid operations under various operating conditions. Higher boiling petroleum oils, such as gas oil, have been treated with catalysts comprising silica at a temperature in the range from about 600° F. to about 1100° F. in order to crack the oil and to secure petroleum oil fractions boiling in the motor fuel boiling range. These operations are generally conducted using a fluid catalyst wherein the catalyst particles have a particle size in the range from about 20 to 200 microns and higher. The solid sub-divided particles are maintained in a fluid ebullient state by means of an upflowing suspending gas, the velocity of which is usually in the range from 0.5 to 5.0' per second.

Heretofore these catalysts have been prepared by various procedures. One method employed for the preparation of a silica hydrogel is to mix an alkali metal silicate such as a sodium silicate ($Na_2O.3.25SiO_2$) solution have a specific gravity of about 1.21 with a mineral acid such as a sulfuric acid having a specific gravity of about 1.19 to form an acid silica hydrosol which sets after a period of time to a firm hydrogel. This hydrogel can be readily washed free of impurities and then composited with a catalytically active compound such as alumina by impregnating the washed hydrogel with an aluminum salt which is then decomposed to alumina by heat or by chemical action as by treatment with a precipitant for the aluminum salt such as ammonia. Catalysts comprising silica and magnesia can be prepared by first preparing a silica hydrogel as described above whereupon the hydrogel is washed and mixed and granulated with magnesia and water. The mixture of silica gel and magnesia is passed through a colloid mill, homogenized therein. Then the composite catalyst is aged at room temperature for a period of from about 24 to 72 hours or for shorter periods of time if elevated temperatures are employed. The catalyst is then dried and activated for use. Another procedure for the preparation of catalysts comprising a silica hydrogel and magnesia, is to prepare the silica hydrosol by known methods and then to add magnesia preferably as a water slurry. Prior to the addition of magnesia, the silica hydrosol may be impregnated with oxides of other materials such as beryllium, manganese, and the like. The magnesia-containing hydrosol is then converted to gel dried and activated for use or, if desired, all or a portion of the magnesia can be replaced by treating the magnesia-containing gel with a salt of a metal the oxide of which is catalytically active in the reaction.

There are also several known methods in the prior art for increasing and controlling to a limited extent the pore size of silica gels. For example, one method is to treat the hydrogel at elevated temperatures up to about 212° F. for periods ranging from one to several days. This tends to increase the pore diameter but the increase is only moderate in extent. Another method employed is to treat the hydrogel with a weakly alkaline material such as dilute ammonia. Here again the increase in pore diameter is only moderate in extent. Furthermore, this method appears to impair the physical strength of the gel.

An additional method employed is to displace the water of hydrogels with an organic solvent which is then evaporated at substantially atmospheric pressure. Here again the increase in pore size is very small. Also in this process it is necessary to employ non-aqueous solvents. Still another method employed in an attempt to overcome this problem of pore size as disclosed in U. S. Patent No. 2,330,640 is to displace the water of the hydrogel with an organic solvent such as methyl alcohol whereupon the alcohol-containing gel is sealed in a bomb and heated so that the critical pressure of the alcohol or other solvent is rapidly exceeded and the heating is continued until the critical temperature of the alcohol or other solvent is reached whereupon the vapors are slowly released from the bomb while the temperature of the bomb's content is maintained above the critical temperature of the alcohol or other solvent. These products are known in the art as aerogels. One disadvantage of this particular process is that the aerogels generally have less physical strength. It is also necessary in the preparation of aerogels to employ non-aqueous solvents and the heating and evaporation technique at high pressures are difficult to carry out.

A new procedure for the preparation of improved catalyst comprising silica by which it is possible to control the porosity of the gel has now been discovered. In accordance with the procedure in accordance with the present invention, hydrofluoric acid or substances which form hydrofluoric acid in situ are added to acid silica hydrosols. In accordance with this invention, silica gels of especially large and controlled pore diameter are secured. This is very desirable, for example, if the silica gel is to be used as an adsorbent or as a catalyst carrier.

This is accomplished by treating sols comprising silica with hydrofluoric acid or materials such as alkali metal fluorides which produce hydrofluoric acid in situ in the acid silica hydrosol. The proportion of hydrofluoric acid used may be as high as 4 mols per mol of $SiO_2$, but is preferably in the range between about 0.1 to 1.0 mol of hydrofluoric acid per mol of $SiO_2$. The present invention is applicable not only to the production of silica gels but also to the preparation of composite gels comprising silica in which, however, the silica is the major component or comprises at least 75% by weight of the composite. Other oxide gels which can be composited with the silica are those of aluminum, magnesium, molybdenum, manganese, chromium, beryllium and the like.

When operating in accordance with this invention, the rate of setting of a hydrosol to a hydrogel is materially increased. Furthermore, the porosity of the finished gel as measured by the pore volume and pore diameter is remarkably increased, this increase being out of all proportion to any amount that might be expected on the basis of dissolving silica by hydrofluoric acid. In addition, the hydrogel obtained is strongly hydrophilic. This is entirely unexpected because of the well known effect of treating hydrogels with hydrofluoric acid where a dry gel having hydrophobic properties is obtained. In other words, when the silica is treated with hydrofluoric acid in the sol stage, an entirely different effect is obtained from that resulting from the treatment of silica in the hydrogel stage.

The process of this invention may be more readily understood by reference to the following examples illustrating embodiments and adaptations of the same.

Example I

A series of silica hydrosols was prepared by adding silicon tetrachloride to ice in the proportion of 1.67 gram mols of $SiCl_4$ per 2000 grams of ice. Immediately after the preparation of the sols, various amounts of hydrofluoric acid in the form of a 48% aqueous solution were added. The treated sols were allowed to set to hydrogels. The various hydrogels were aged overnight, washed free of electrolytes, and dried. The time required for the hydrosols to set after the addition of hydrofluoric acid and the physical properties of the finished gels are as follows:

Table I

| Mol Ratio $HF/SiO_2$ | Set Time, Min. | Specific Surface, m.²/g. | Pore Diam., A. U.[1] | Pore Vol., cc./g. | Particle Density, g./cc. |
|---|---|---|---|---|---|
| 0 | 150 | 839 | 24 | 0.548 | 0.99 |
| 0.5 | 5 | 323 | 102 | 0.926 | 0.16 |
| 1 | 2 | 300 | 110 | 0.961 | 0.086 |
| 2 | 0.5 | 253 | 125 | 0.970 | 0.066 |
| 3 | 0.5 | 240 | 270 | 0.968 | 0.026 |
| 4 | 2 | 224 | 161 | 0.975 | 0.055 |

[1] Angstrom units.

The above specific surfaces, pore diameters, and pore volumes were determined by the usual methods involving the nitrogen adsorption isotherm at liquid nitrogen temperature. The particle densities were calculated from the pore volumes. From the data, it is evident that a given amount of hydrofluoric acid is most effective when used in proportions of less than about one mol of HF per mol of $SiO_2$.

Example II

To 333 volumes sulfuric acid sp. gr. 1.19 were added with stirring 667 volumes sodium silicate sp. gr. 1.21. The sol set to a hydrogel in about 150 minutes. The hydrogel was washed free of electrolytes and dried. This gel had the following properties: specific surface 710 m.²/g., pore diameter 25 A.U., pore volume 0.421 cc./g., particle density 1.27.

Another batch of hydrosol was prepared by adding to 333 volumes of sulfuric acid solution, sp. gr. 1.19, 667 volumes of sodium silica ($Na_2O$—$3.25SiO_2$) solution, sp. gr. 1.21, whereupon 123 volumes of 6 N KF were added with stirring. The sol set to a hydrogel within about 5 minutes. The hydrogel was washed free of electrolytes and dried. In this example, the hydrofluoric acid was supplied by reaction of the potassium fluoride with the sulfuric acid of the hydrosol (the amount of KF used was slightly in excess of the free acid present). The mol ratio of HF to $SiO_2$ was about 0.3. The finished gel had the following properties: specific surface 542 m.²/g., pore diameter 61 A. U., pore volume 0.84 cc./g., particle density 0.35.

Example III

To 1000 volumes sulfuric acid sp. gr. 1.19 were added 1000 volumes sodium silicate sp. gr. 1.21. The hydrosol set to a hydrogel in about 100 minutes. The hydrogel was washed and dried. This gel had the following properties: specific surface 810 m.²/g., pore diameter 27 Å. U., pore volume 0.478 cc./g., particle density 1.17 g./cc.

Another batch of hydrosol was prepared by adding to 1000 volumes of sulfuric acid sp. gr. 1.19 1000 volumes of sodium silicate sp. gr. 1.21 whereupon 364 volumes of 4.83 N KF were added with stirring. The sol set to a hydrogel in about 2 minutes. The hydrogel was washed free of electrolytes and dried. In this case, the mol ratio of HF to $SiO_2$ was about 0.5. The finished gel had the following properties: specific surface 460 m.²/g., pore diameter 92 Å. U., pore volume 0.82 cc./g., particle density 0.40 g./cc.

Example IV

Another batch of hydrosol was prepared by adding to 1000 volumes sulfuric acid sp. gr. 1.19 1000 volumes sodium silicate sp. gr. 1.21 whereupon 182 volumes 4.83 N potassium fluoride were added with stirring. The hydrosol set to a hydrogel, was washed and dried. In this case, the mol ratio of HF to $SiO_2$ was about 0.25. This gel had the following properties: specific surface 597 m.²/g., pore diameter 50 Å. U., pore volume 0.835 cc./g., particle density 0.37 g./cc.

EXAMPLE V

A 20% Al₂O₃, 80% SiO₂ catalyst was prepared as follows:

To 5.5 volumes sulfuric acid, sp. gr. 1.19 were added 11 volumes sodium silicate (Na₂O.3.25SiO₂) sp. gr. 1.21, and 5.5 volumes aluminum sulphate solution, sp. gr. 1.31. There were then added 2 volumes of 4.83 normal potassium fluoride (equivalent to 0.25 mol HF per mol of SiO₂). The hydrosol set to a hydrogel within 25 minutes after addition of the KF (this hydrosol requires about 1¾ hours to set when no fluorides are added). The hydrosol was broken into lumps and treated with 12.7 volumes of 5.9% ammonia solution for four hours. The hydrogel was then washed free of salts and dried in a steam heated oven.

EXAMPLE VI

A 13% Al₂O₃, 87% SiO₂ catalyst was prepared as follows:

To 11 volumes of sulphuric acid, sp. gr. 1.19 were added 11 volumes of sodium silicate (Na₂O.3.25SiO₂), sp. gr. 1.21. There were then added 4 volumes of 4.83 normal potassium fluoride solution (equivalent to 0.5 mol HF/mol of SiO₂). The hydrosol set to a hydrogel within approximately 2¼ minutes after the potassium fluoride was added. The hydrogel was washed with water till free of soluble material. The washed hydrogel was soaked overnight in 12.1 volumes of aluminum sulphate solution, sp. gr. 1.17. The latter solution was drained off and the impregnated hydrogel was treated with 12.1 volume of 3.6% ammonia solution for four hours. The hydrogel was again washed with water till free of ammonium sulphate. The hydrogel was then dried in a steam heated oven.

The preparation of a 13% Al₂O₃ catalyst was repeated except that the addition of the potassium fluoride was omitted. In this case approximately 1¼ hours were required for the hydrosol to set to a hydrogel.

The catalysts prepared in this way were used to crack an East Texas light gas oil at 0.6 v./v./hr. at 850° F. The results are summarized in Table II below.

TABLE II

*Cracking tests, East Texas light gas oil, 0.6 v./v./hr., 850° F., 2 hr. cycles*

| HF Used Mol/Mol of SiO₂ | Specific Surface M.²/g. | Pore Diam., A. U. | Pore Vol., cc./g. | Conv. Per Cent of Feed | i-C₄H₈ Wt. Per Cent on Feed | i-C₄H₈ Wt. Per Cent on Gas Oil Converted |
|---|---|---|---|---|---|---|
| 0.5 | 456 | 45 | 0.676 | 55.2 | 0.693 | 1.26 |
| 0.0 | 500 | 25 | 0.525 | 60.4 | 0.609 | 1.03 |

It will be noted that the fluoride treated catalyst is particularly desirable for its high yield of isobutylene during the cracking operation. The isobutylene is an especially valuable raw material for various chemicals and rubber.

The process of the present invention is not to be limited by any theory as to mode of operation but only in and by the following claims. This application is a continuation-in-part of my application Serial No. 707,045, filed October 31, 1946, now abandoned.

What is claimed is:

1. In the process of preparing gels comprising silica, the improvement which comprises preparing a silica hydrosol and adding to said sol a member of the group consisting of hydrofluoric acid and alkali metal fluorides in an amount equivalent to at most four mols of hydrofluoric acid per mol of SiO₂, said amount of hydrofluoric acid being sufficient to substantially increase the pore diameter and reduce the particle density of the resultant gels.

2. The process as defined in claim 1 wherein the amount of hydrofluoric acid is between 0.1 to 1 mol per mol of SiO₂.

3. The process as defined in claim 1 wherein the hydrofluoric acid is added in the form of an alkali metal fluoride.

4. The process as defined in claim 1 wherein the silica hydrosol is prepared from silicon tetrachloride.

5. The process as defined in claim 1 wherein the sol is prepared by adding a solution of sodium silicate to a sulfuric acid solution, the hydrofluoric acid is added in the form of an alkali metal fluoride and the amount of fluoride added is equivalent to from 0.1 to 1 mol of hydrofluoric acid per mol of SiO₂.

6. In the process of preparing gels comprising upwards of 75 weight per cent of silica and less than 25 weight per cent of a catalytic metal oxide, the improvement which comprises preparing a silica hydrosol and adding to said sol a member of the group consisting of hydrofluoric acid and alkali metal fluorides in an amount equivalent to at most four mols of hydrofluoric acid per mol of SiO₂, said amount of hydrofluoric acid being sufficient to substantially increase the pore diameter and reduce the particle density of the resultant gels and incorporating a catalytic metal oxide therein.

7. In the process of preparing composite gels containing more than 75% of silica and less than 25% of alumina, the improvement which comprises preparing a silica hydrosol and adding to said sol a member of the group consisting of hydrofluoric acid and alkali metal fluorides in an amount equivalent to at most four mols of hydrofluoric acid per mol of SiO₂, said amount of hydrofluoric acid being sufficient to substantially increase the pore diameter and reduce the particle density of the resultant gels and incorporating alumina therein.

8. In the process of preparing composite gels containing more than 75% of silica and less than 25% of alumina, the improvement which comprises preparing a silica hydrosol, adding an aluminum compound and a member of the group consisting of hydrofluoric acid and alkali metal fluorides in an amount equivalent to from 0.1 to 1 mol of hydrofluoric acid per mol of SiO₂, allowing the hydrosol to set to the hydrogel and treating the hydrogel to convert the aluminum compound to alumina.

CHARLES N. KIMBERLIN, Jr.

No references cited.